Oct. 21, 1941.  P. M. HALLETT  2,259,627
BORING HEAD
Filed Feb. 20, 1941  2 Sheets-Sheet 2
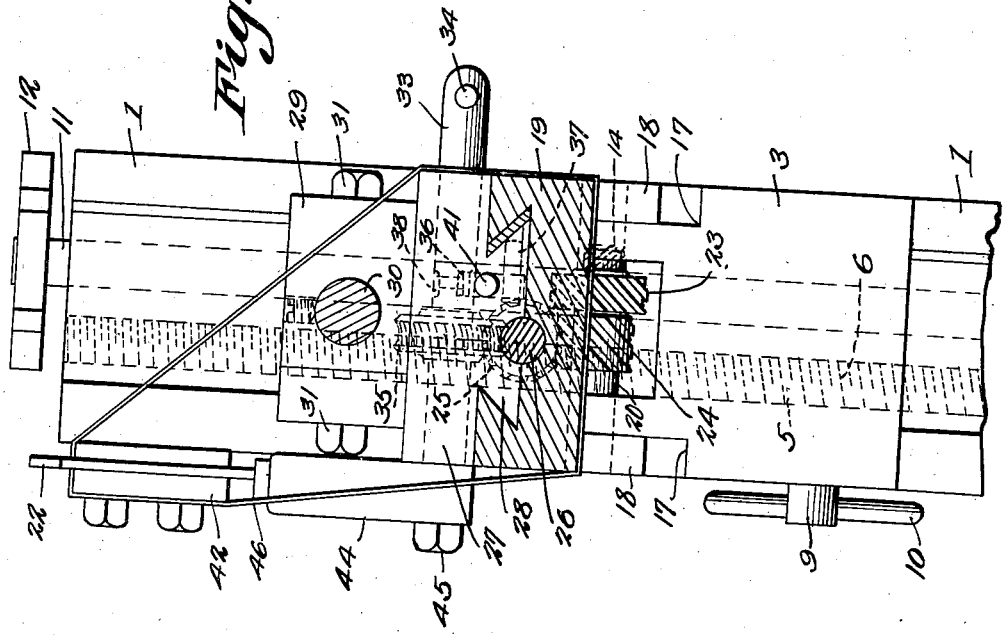
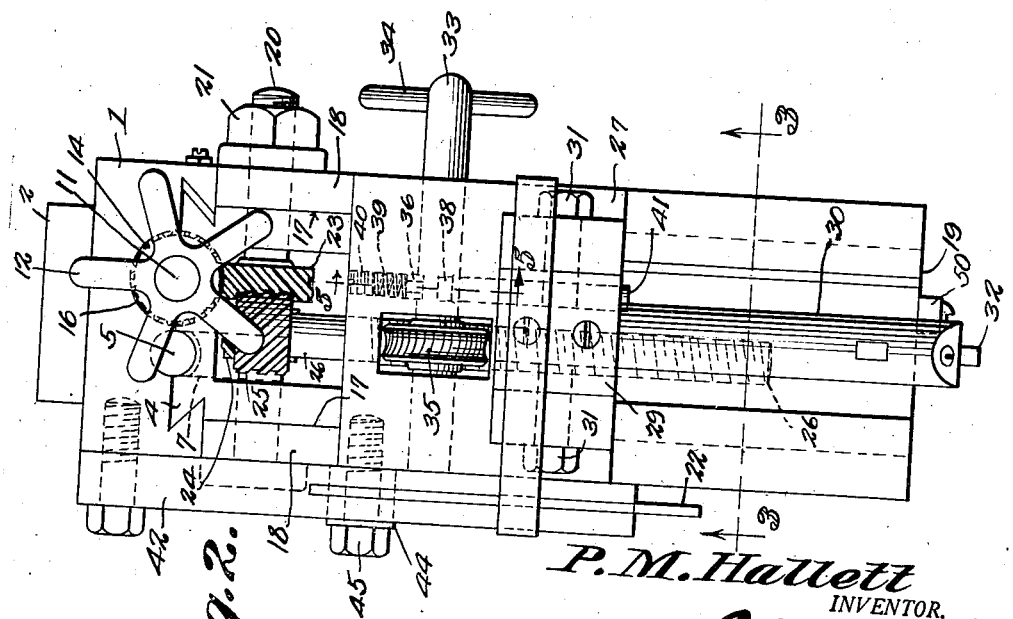
P. M. Hallett
INVENTOR.
BY C. A. Snow & Co.
ATTORNEYS.

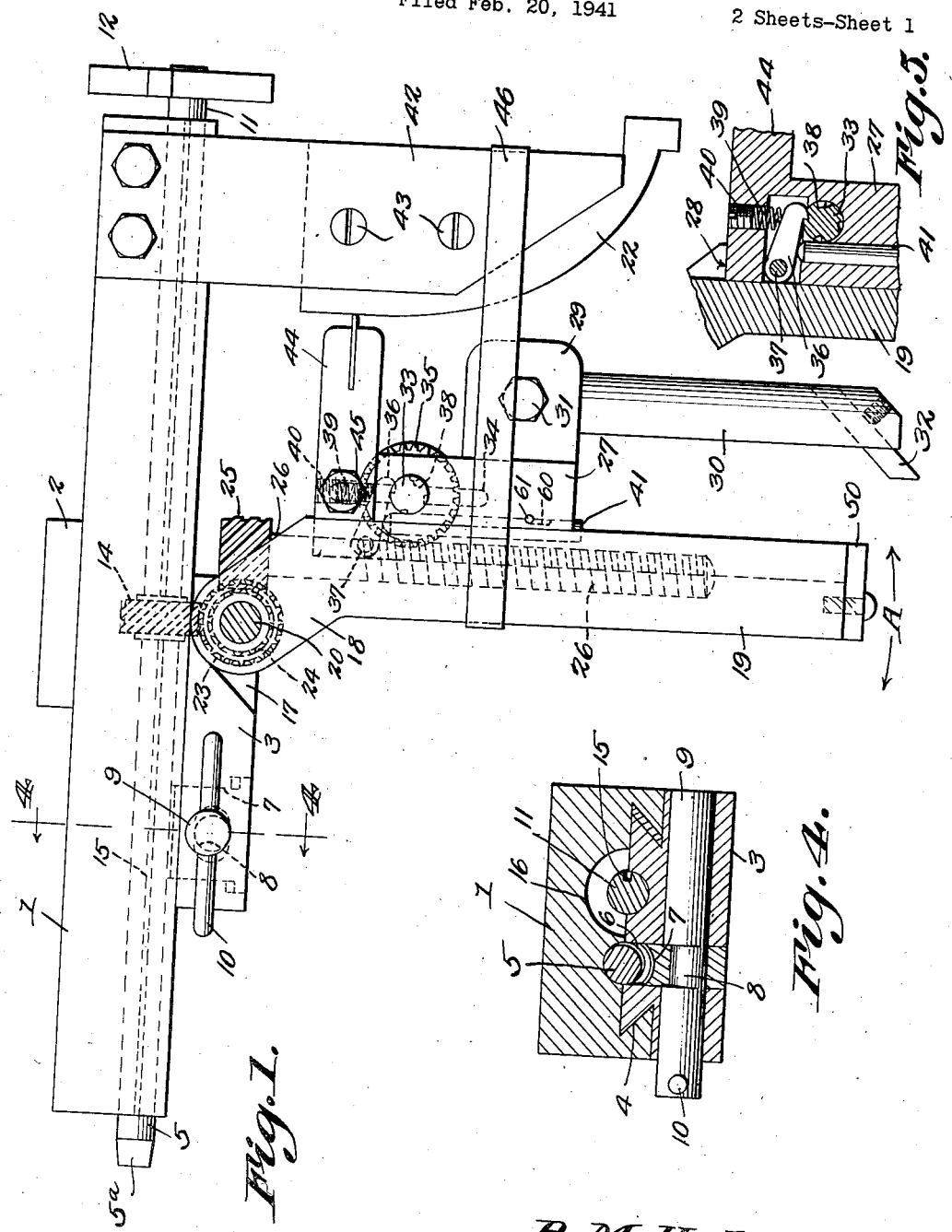

Patented Oct. 21, 1941

2,259,627

UNITED STATES PATENT OFFICE 2,259,627

BORING HEAD

Percy M. Hallett, Stoughton, Wis.

Application February 20, 1941, Serial No. 379,897

6 Claims. (Cl. 77—57)

This invention aims to supply a novel adjunct to a jig borer, boring bar, milling machine, or other appropriate instrumentality, to facilitate jig-boring, form-boring, or turning, novel means being provided for securing actuation, mounting, and cooperation, between the several component parts.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 1 shows in side elevation, a device constructed in accordance with the invention;

Fig. 2 is an end elevation;

Fig. 3 is a transverse section, many parts appearing in elevation;

Fig. 4 is a section on the line 4—4 of Fig. 1;

Fig. 5 is a section on the line 5—5 of Fig. 2.

The device forming the subject matter of this application comprises an elongated body 1, secured by any appropriate means 2 to the machine whereon it is used. For some classes of work, the part 2 may be the tool post holder of a lathe (not shown). A slide 3 is mounted to move longitudinally of the body 1 and is dovetailed to the body, as shown at 4, for such movement.

A feed shaft 5 is mounted to rotate in the body 1 and is threaded as indicated at 6, to cooperate with a half nut 7, mounted to move in the slide 3, transversely thereof. The feed shaft 5 is shaped at its outer end, as shown at 5a, to receive any suitable instrumentality for rotating the shaft, for example, the star wheel 12, hereinafter mentioned and capable of being shifted from one end of the feed shaft to the other.

The half nut 7 is moved into and out of engagement with the threaded portion 6 of the feed shaft 5, through the instrumentality of an eccentric 8 on a cross shaft 9, mounted to rotate in the slide 3, the cross shaft being provided with a handle 10. If the half nut 7 is engaged with the threaded part 6 of the feed shaft 5, then the slide 3 will be advanced along the body 1 when the feed shaft is rotated. If the half nut 7 is not engaged with the threaded part 6 of the feed shaft 5, the slide 3 will derive no motion from the feed shaft.

An operating shaft 11 is mounted to rotate in the body 1, and is disposed parallel to the feed shaft 5. The operating shaft 11 carries at one end the star wheel 12 hereinbefore mentioned. The star wheel 12 may be turned manually, to rotate the operating shaft 11, or if the machine wherewith the device is used has an appropriate actuating part, that part, cooperating with the star wheel, will secure a rotation of the shaft 11.

The operating shaft 11 passes through a worm wheel 14, splined at 15 to the operating shaft 11, for movement therealong, since the worm wheel 14 is interengaged with the slide 3, to move therewith. The body 1 has an elongated recess 16, accommodating the worm wheel 14, and permitting the worm wheel to move longitudinally of the operating shaft 11.

At its inner end, and at its sides, the slide 3 is cut away, as shown at 17, to receive ears 18 at the end of a radius arm 19. The radius arm 19 is mounted to swing for adjustment, in the direction of the arrows A in Fig. 1, on a cross shaft 20, mounted in the slide 3.

The cross shaft 20 is a tightening bolt, carrying a nut 21. In connection with some classes of work, the radius arm 19 and parts carried by it are adapted to follow a templet 22, shown in Fig. 1, an operation which will be alluded to hereinafter. Under such circumstances, the radius arm 19 has free swinging movement on the cross shaft 20. The templet 22 may be of any desired shape and construction, the form shown being illustrative merely.

In connection with some classes of work, it may be desirable to hold the radius arm 19 at a fixed but adjustable angle with respect to the line of advance of the slide 3. Under such conditions, the nut 21 on the cross shaft 20 may be set up, and the ears 18 of the radius arm 19 will bind on the interposed portion of the slide 3.

A pinion 23 is mounted to rotate on the cross shaft 20, and meshes with the worm wheel 14 on the operating shaft 11. Secured to one side of the pinion 23 is a worm wheel 24, meshing with a worm 25 on one end of a feed screw 26, rotatable in the radius arm 19, and extended longitudinally thereof.

A tool carrier 27 is dovetailed at 28 to the radius arm 19, for movement longitudinally thereof, the tool carrier having an offset 29. A post 30 is adjustably secured, by a bolt or screw 31, to the offset 29 of the tool carrier 27 and may be disposed parallel to the radius arm 19. A transverse tool 32 is releasably held in the post 30, and is located near the free end of the post.

A cross shaft 33 is mounted to rotate in the tool carrier 27 and is provided with a turning handle 34. A worm wheel 35 is secured to the cross shaft 33 and engaged with the feed screw 26 in the radius arm 19. At times, the worm wheel 35 is held against rotation, by a means to be described hereinafter, and then the worm wheel functions like a fixed rack with respect to the feed screw 26. When the feed screw 26 is rotated, the feed screw, cooperating with the fixedly held worm wheel 35, imparts sliding movement to the tool carrier 27, longitudinally of the radius arm 19.

It may be remarked at this place that the driving train for the feed screw 26 embodies the operating shaft 11, the worm 14, the pinion 23, the worm wheel 24, and the worm 25 on the feed screw 26.

The means for holding the worm wheel 35 against rotation, so that it will serve as a fixed rack cooperating with the feed screw 26, embodies a dog 36, pivotally mounted at 37 on the tool carrier 27, and adapted to engage with circumferentially spaced seats 38 in the cross shaft 33. The dog 36 is held releasably engaged with seats 38 of the cross shaft 33, by a compression spring 39 in the tool carrier 27, the spring being held in place and adjusted through the instrumentality of a screw 40, threaded into the tool carrier 27.

A releasing rod 41 is slidably mounted in the tool carrier 27 and engages the dog 36. The throw of the rod 41 is limited by a cross pin 61 mounted in the tool carrier 21 and received in an elongated recess 60 in the rod. The tool carrier 27 moves downwardly along the radius arm 19, under the impulse of the feed screw 26, but, ultimately, the rod 41 comes into contact with a stop 50 that is secured to the member 19, and the rod 41 kicks the dog 36 clear of the shaft 33. The shaft 33 then may be manipulated by means of the handle 34 to retract the tool carrier 27 quickly, the seats 38 in the cross shaft 33 being so constructed that the dog can click over them when retracting movement is imparted to the tool carrier 27.

To the body 1 is detachably secured a depending bracket 42, whereon the aforesaid templet 22 is detachably mounted as indicated at 43. A follower 44 is detachably secured at 45 to the tool carrier 27 and is adapted to traverse the edge of the templet 22, which, it may be recalled, may be of any desired form. Any suitable spring means may be supplied for maintaining the follower 44 in intimate engagement with the templet 22, a simple elastic band 46 being shown as an illustrative means, the band being engaged around the bracket 42 and around the radius arm 19.

The work may turn with respect to the device described, or the device may turn with respect to the work. The slide 3 may be made to assume adjusted positions with respect to the body 1, by operating the feed shaft 5. The radius arm 19 may be held in adjusted positions by tightening the bolt shaft 20—21. The worm wheel 35, if held by the dog 36, functions like a rack, cooperating with the feed screw 26, to secure an advancing movement of the tool 32 and parts which carry it. By tightening the bolt 31, the post 30 may be held at angles to the radius arm 19 differing from the angle shown.

If the securing elements 43, the bracket 42, the templet 22, the band 46 and the follower 44 are removed, the tool 32, or its equivalent, and attendant parts, may be used for jig boring. For form boring or turning, the parts are used in the assembly depicted in Fig. 1.

Having thus described the invention, what is claimed is:

1. In a compound tool of the class described, an elongated body, a feed shaft and an operating shaft carried by the body in approximately parallel relation, a slide mounted to move along the body, a connection between the feed shaft and the slide and operative to impart movement to the slide from the feed shaft, a cross shaft mounted on the slide, a radius arm mounted for swinging movement on the cross shaft, a feed screw journaled in the radius arm, a tool carrier mounted to slide longitudinally of the radius arm, mechanism including the cross shaft for imparting rotation to the feed screw from the operating shaft, and means for imparting sliding movement to the tool carrier from the feed screw.

2. A compound tool of the class described, constructed as set forth in claim 1, and wherein the cross shaft is a tightening element, holding the radius arm at adjusted angles with respect to the line of reciprocation of the slide.

3. A compound tool of the class described, constructed as set forth in claim 1, and wherein said means is a worm wheel supported on the tool carrier and engaged with the feed screw, and means for holding the worm wheel against rotation as the tool carrier makes its working stroke, and for releasing the worm wheel for rotation before the tool carrier begins its return stroke.

4. A compound tool of the class described, constructed as set forth in claim 1, and wherein said means is a worm wheel supported on the tool carrier and engaged with the feed screw, means for holding the worm wheel against rotation as the tool carrier makes its working stroke, and for releasing the worm wheel for rotation before the tool carrier begins its return stroke, and means under the control of an operator for imparting reverse rotation to the worm wheel, to cause the tool carrier to make its return stroke.

5. A compound tool of the class described, constructed as set forth in claim 1, and wherein said means comprises a worm wheel supported on the tool carrier and engaged with the feed screw, a pawl and ratchet mechanism connecting the worm wheel with the tool carrier and holding the worm wheel against rotation as the tool carrier makes its working stroke, a releasing member on the tool carrier and engaging the pawl, and a stop on the tool carrier, wherewith the releasing member engages, to disengage the pawl from the ratchet before the tool carrier begins its return stroke.

6. A compound tool of the class described, constructed as set forth in claim 1, in combination with a templet holder on the body, a follower, means for detachably securing the follower to the tool carrier, and yieldable means for maintaining the follower engaged with a templet on the templet holder.

PERCY M. HALLETT.